United States Patent [19]

Glenn

[11] Patent Number: 4,950,883
[45] Date of Patent: Aug. 21, 1990

[54] FIBER OPTIC SENSOR ARRANGEMENT HAVING REFLECTIVE GRATINGS RESPONSIVE TO PARTICULAR WAVELENGTHS

[75] Inventor: William H. Glenn, Vernon, Conn.

[73] Assignee: United Technologies Corporation, Hartford, Conn.

[21] Appl. No.: 289,864

[22] Filed: Dec. 27, 1988

[51] Int. Cl.⁵ .......................... H01J 5/16; G01D 5/34
[52] U.S. Cl. ............................ 250/227.14; 250/237 G
[58] Field of Search ............... 250/227, 231 R, 237 G; 73/705

[56] References Cited

U.S. PATENT DOCUMENTS 4,517,456 5/1985 Halsall et al. ..................... 250/227
4,562,344 12/1985 Mihara et al. ..................... 250/227

Primary Examiner—David C. Nelms
Assistant Examiner—William Oen
Attorney, Agent, or Firm—Peter R. Ruzek

[57] ABSTRACT

An arrangement for sensing changes in a monitored parameter includes an optical fiber which has at least one sensing fiber length including a sensing portion situated at a monitoring location of a body. Two periodic gratings of the same periodicity are situated in the fiber each at a different end of the sensing fiber length. Such gratings are reflective to a predominant portion of any light that propagates in the fiber and has a wavelength in a stopband range around twice the periodicity. When broadband coherent light including sensing light with wavelengths within the stopband range is launched into a first end of the optical fiber for propagation longitudinally of the fiber toward a first of the gratings, the predominant portion of the sensing light is reflected from the first grating and the remainder of the sensing light passes into the sensing fiber length, where resonant buildup of light at certain wavelengths that are located within the stopband range and depend on the length of the sensing portion as influenced by changes in the monitored parameter takes place, and the gratings are rendered substantially transparent to the sensing light at the plurality of wavelengths following the buildup. The effect of the gratings and of the sensing length on the wavelengths of the light emerging from one of the end portions of the optical fiber is then detected.

6 Claims, 1 Drawing Sheet

FIBER OPTIC SENSOR ARRANGEMENT HAVING REFLECTIVE GRATINGS RESPONSIVE TO PARTICULAR WAVELENGTHS

DESCRIPTION

1. Technical Field

The present invention relates to sensing arrangements in general, and more particularly to sensing arrangements using optical fibers as their sensing elements.

2. Background Art

There are already known various constructions of sensing arrangements, among them such utilizing optical fibers as their sensing elements. So, for instance, the commonly owned U.S. Pat. No. 4,761,073, issued on Aug. 2, 1988, discloses a distributed spatially resolving optical fiber strain gauge wherein a plurality of periodic gratings each having a different periodicity is imprinted in an optical fiber that is embedded in a structure to be monitored for stresses or temperature induced changes. Each of the periodic gratings acts as a highly efficient yet not completely reflecting mirror for light of a frequency within a narrow yet not negligible bandwidth around that corresponding to twice the periodicity of the grating, but is virtually transparent to light of all other frequencies, thus creating a stopband in the spectrum passing through the grating. When the periodicity of the respective grating changes as a result of change in the length of the optical fiber section that has the respective grating imprinted therein, due to stress applied to or temperature change of this section, the stopband shifts correspondingly in the passing spectrum, and this frequency change is then detected and used to draw conclusions as to the conditions existing in the structure being monitored at the location of the respective grating. Inasmuch as the stopbands of the various gratings are spaced from one another in the frequency domain due to the different periodicities of such gratings, it is possible to allocate the respective stopband shift to the associated grating and thus to the associated location of the structure being monitored and thus to associate the respective change in the temperature, stress or other physical phenomenon or parameter being monitored with the corresponding structural location, while also determining the magnitude of the change in the monitored parameter at that location from the extent of the stopband shift.

However, experience with this type of sensing or monitoring arrangement has shown that, because the grating has only a rather limited effective length in which the light of frequency within the stopband is substantially completely reflected and thus would not reach further downstream portions of the grating if the grating were made longer than this effective length, and because the region of the structure whose parameter is being sensed or monitored is correspondingly dimensionally limited, the sensitivity of the grating to changes in the parameter of the structure or body which is being monitored is inadequate for many applications in which it would otherwise be desirable to employ the arrangement of this type.

Accordingly, it is a general object of the present invention to avoid the disadvantages of the prior art.

More particularly, it is an object of the present invention to provide a fiber optic sensing arrangement which does not possess the disadvantages of the known arrangements of this kind.

Still another object of the present invention is to develop the sensing arrangement of the type here under consideration in such a manner as to make it more sensitive than heretofore known arrangements to smaller changes in the parameter being measured or monitored.

It is yet another object of the present invention to devise a sensing arrangement of the above type which renders it possible to simultaneously sense the same parameter at different locations of the body or different parameters at the same or at different locations of the body, and to correctly allocate the results to the respective locations and/or parameters.

A concomitant object of the present invention is design the sensing arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an arrangement for sensing changes in at least one monitored parameter exhibited by a body. This arrangement includes an optical fiber having two longitudinally spaced end portions. The optical fiber includes at least one sensing fiber length disposed between the end portions, having two ends spaced by a predetermined distance from one another as considered longitudinally of the fiber, and including a sensing portion situated at a monitoring location of the body, and two periodic gratings of the same periodicity each situated in the fiber at one of the ends of the sensing fiber length. Each of these gratings is reflective to a predominant portion of any light that propagates in and longitudinally of the fiber and has a wavelength in a stopband range around a central wavelength corresponding to twice the periodicity while being substantially transparent to light of wavelengths outside the stopband range. The sensing arrangement further includes means for launching broadband coherent light including sensing light with wavelengths within the stopband range into a first end of the optical fiber for propagation longitudinally of the fiber toward a first of the gratings for reflection of the predominant portion of the sensing light from the first grating and passage of the remainder of the sensing light into the sensing fiber length for resonant buildup therein of light at certain wavelengths that are located within the stopband range and depend on the length of the sensing portion as influenced by changes in the monitored parameter, and attendant rendering of the gratings substantially transparent to the sensing light at the plurality of wavelengths following the buildup. Finally, the sensing arrangement includes means for detecting the effect of the gratings and of the sensing length on the wavelengths of the light emerging from one of the end portions of the optical fiber.

BRIEF DESCRIPTION OF THE DRAWING

The present invention will be described in more detail below with reference to the accompanying drawing in which.

BEST MODE FOR CARRYING OUT THE INVENTION

Figure 1:
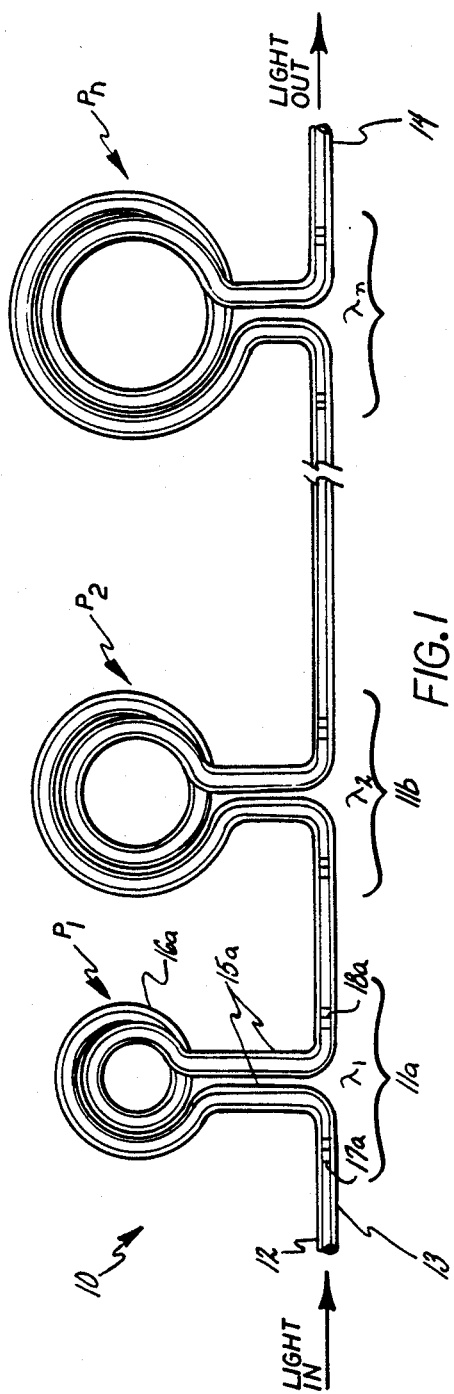
FIG. 1 is a simplified diagrammatic view of a multiplexed fiber optic sensing array constructed in accordance with the present invention.

Referring now to the drawing in detail, and first to FIG. 1 thereof, it may be seen that the reference numeral 10 has been used therein to identify a multiplexed fiber optic sensor array embodying the present invention. The sensor array 10 includes a plurality of successive sensing arrangements 11a to 11n (wherein n is any arbitrary positive integer) which, except as will be discussed later, are of the same construction, so that it is not necessary to describe each such section 11a to 11n separately; rather, the following discussion will be directed only to section 11a.

The section 11a is situated adjacent to an input end portion 12 of an optical fiber 13 which further interconnects the various sections 11a to 11n and finally terminates in another end portion 14. As a matter of fact, in a currently preferred implementation of the present invention, the sections 11a to 11n are constituted by respective parts of the optical fiber 13 as well.

The section 11a includes a sensing fiber length 15a that includes a sensing portion 16a which is situated at a monitoring location of a body, such as a solid structure or a body of liquid or gas, whose selected property or parameter is to be monitored or sensed. This parameter may be the stress or temperature at the predetermined location of a structure in which the sensing portion 16a is embedded, or pressure in the body of liquid or gas or, if the sensing portion is coated with well-known materials that respond to phenomena such as magnetic or electric field changes by expanding or contracting with attendant application of commensurate longitudinal stresses to the sensing portion 16a, even to such parameters. Any change in the selected parameter results in a commensurate change in the length of the sensing portion 16a, and thus in a corresponding change in the length of the sensing fiber length 15a.

The section 11a further includes two periodic gratings 17a and 18a which extend transversely of the longitudinal axis of the optical fiber 13 at the respective ends of the optical fiber length 15a. These gratings 17a and 18a are shown in FIG. 1, for the sake of better visualization thereof, as extending radially beyond the confines of the fiber 13. Such gratings 17a and 18a may indeed be constituted by separate components which are interposed between the respective portions of the optical fiber 13 and the sensing fiber length 15a. However, especially since such separate components invariably introduce optical losses, it is currently preferred to provide such gratings 17a and 18a directly in the fiber 13 at the appropriate locations. The gratings 17a and 18a may advantageously be imprinted in the optical fiber 13 by resorting to the method described in the aforementioned U.S. Pat. No. 4,761,073, the disclosure of which is incorporated herein by reference to the extent necessary for understanding the present invention.

Both gratings 17a and 18a form a set in that they have the same periodicity differing from that of any other set, so that each of the gratings 17a and 18a constitutes a quite efficient reflector or mirror for light of wavelengths within and only within a narrow yet not negligible stopband around a wavelength corresponding to twice the grating periodicity. However, a small portion of the light in this stopband will still be able to penetrate through the respective grating 17a or 18a. Now, quite surprisingly, it has been discovered that those wavelengths of this rather minuscule portion of light that enters the sensing fiber length 15a which have certain wavelengths within the stopband which correspond to resonant wavelengths of a resonator constituted by the gratings 17a and 18a and the sensing fiber length 15a not only experience buildup in the resonator, but also, in effect, make the grating 17a at least partially transparent to such wavelengths upon such buildup by interacting in the grating 17a with the incoming light of corresponding wavelengths. This, in turn, means that a substantial amount of the resonating light buildup at these wavelengths will be able to pass through the grating 18a to propagate without any substantial interference through the sections 11b to 11n (being outside the stopbands of the corresponding gratings of these sections) to the other end portion 14 of the optical fiber 13. By the same token, the light of wavelengths within the stopband of any one of the sections 11b to 11 or will be able to propagate without substantial interference not only through the section 11a, but also through any other of the sections 11b to 11n, and so will the light at wavelengths outside the stopband of the respective sections 11b to 11n so long as it does not fall into the stopband of the respective other one of the sections 11a to 11n. The other effect of this phenomenon is that the light within the stopband that is reflected from the grating 17a for propagation to and out of the input end 12 will be substantially devoid of the aforementioned certain wavelengths. Thus, the length of the Fabry-Perot resonator can be determined at any instant of time from the presence of light at the certain wavelengths within the stopband in the light that emerges from the end portion 14, or from the absence of light at the certain wavelengths within the stopband from the light that emerges from the end portion 12, by analyzing such light in the frequency domain.

Figure 2:
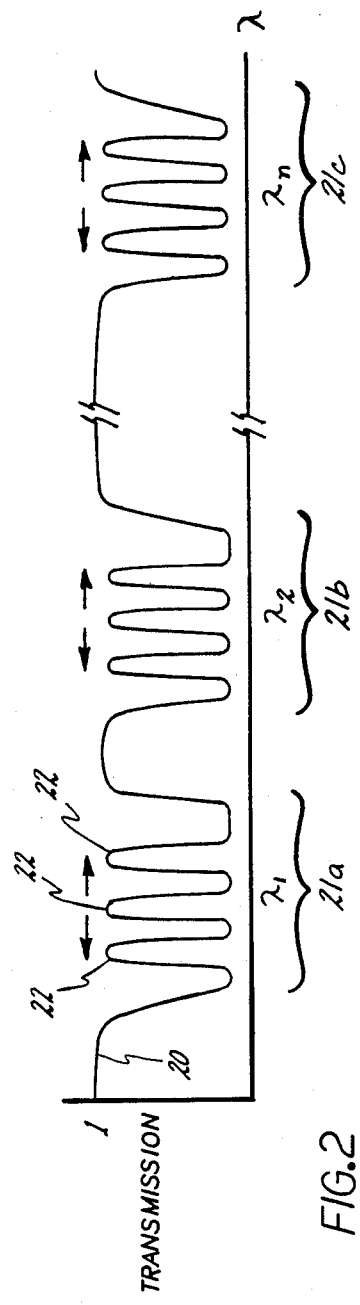
FIG. 2 is a graphic representation of the dependency of relative transmission on frequency for the array of FIG. 1.

A graphic representation of the above-described situation is illustrated in FIG. 2 of the drawing where the reference numeral 20 indicates a transmission curve for the array 10 depicted in FIG. 1 while the reference numerals 21a to 21n identify the stopbands of the respective grating sets of the sections 11a to 11n. It may be seen that the transmission curve 20 has a plurality of transmission peaks 22 (only three of a usually much larger number of such transmission peeks being shown for illustrative purposes) within the stopband 21a (and similarly within each other stopband 21b to 21n). Conversely, the reflection curve, which is an upside-down replica of the transmission curve 20, will have a plurality of reflection drops at the corresponding locations or wavelengths. Hence, either the transmission or the reflection of light at the certain wavelengths, or both, may be used to determine the lengths of the respective resonators.

Now, since the length of the respective resonator is determinative of the frequencies and thus the wavelengths within and only within the stopband of the light that resonates in the resonator, and since the length of the resonator is substantial amounting to, for instance, one hundred wavelengths of the resonating light, even a very small change in the length of the sensing length such as 15a will bring about a radical change in the resonating wavelengths. Thus, even a very small change in the monitored parameter at the respective location of the body, be it stress, temperature, magnetic field, electric field or the like, will be sensed by the respective section 11a to 11n of the arrangement 10 and can be detected in any known manner by examining the transmission or reflection spectrum in the frequency domain.

Thus, it may be seen that the present invention provides a technique for implementing a multitude of fiber optic sensors on a single continuous optical fiber and for multiplexing the output of such sensors for subsequent demultiplexing and evaluation to obtain independent measurements of each sensor's response in such a manner that each sensor is sensitive to even subtle changes in the parameter being monitored at the respective location of the body at which the sensing portion of the sensor is situated.

While the present invention has been illustrated and described as embodied in a particular construction of a multiplexed fiber optic sensor array, it will be appreciated that the present invention is not limited to this particular example; rather, the scope of protection of the present invention is to be determined solely from the attached claims.

I claim:

1. An arrangement for sensing changes in at least one monitored parameter exhibited by a body, comprising
   an optical fiber having two longitudinally spaced end portions and including
      at least one sensing fiber length disposed between said end portions, having two ends spaced by a predetermined distance from one another as considered longitudinally of said fiber, and including a sensing portion situated at a monitoring location of the body, and
      two periodic gratings of the same periodicity each situated in said fiber at one of said ends of said sensing fiber length and reflective to a predominant portion of any light that propagates in and longitudinally of said fiber and has a wavelength in a stopband range around a central wavelength corresponding to twice said periodicity while being substantially transparent to light of wavelengths outside said stopband range;
   means for launching broadband coherent light including sensing light with wavelengths within said stopband range into a first end of said optical fiber for propagation longitudinally of said fiber toward a first of said gratings for reflection of said predominant portion of said sensing light from said first grating and passage of the remainder of said sensing light into said sensing fiber length for resonant buildup therein of light at certain wavelengths that are located within said stopband range and depend on the length of said sensing portion as influenced by changes in the monitored parameter, and attendant rendering of said gratings substantially transparent to said sensing light at said plurality of wavelengths following said buildup; and
   means for detecting the effect of said gratings and of said sensing length on the wavelengths of the light emerging from one of said end portions of said optical fiber.

2. The sensing arrangement as defined in claim 1, wherein said optical further includes at least an additional sensing length arranged in series with said one sensing length and including an additional sensing portion disposed in said body, and two additional periodic gratings similar to said two gratings, associated with and arranged at the respective ends of said additional sensing length, and both having the same periodicity differing from said periodicity of said two gratings so that said stopband of said additional gratings occupies a different region of the spectrum than that of said gratings.

3. The sensing arrangement as defined in claim 2, wherein said sensing portion of said additional sensing length is disposed at a location of said body that is spaced from said location of said sensing portion of said one sensing length.

4. The sensing arrangement as defined in claim 3, wherein said monitored parameter sensed by said sensing portion of said additional sensing length is the same as that sensed by said sensing portion of said one sensing length.

5. The sensing arrangement as defined in claim 2, wherein said monitored parameter sensed by said sensing portion of said additional sensing length is different from that sensed by said sensing portion of said one sensing length.

6. An optical fiber arrangement for use in sensing changes in at least one monitored parameter exhibited by a body, comprising
   an optical fiber having two longitudinally spaced end portions and including at least one sensing fiber length disposed between said end portions, having two ends spaced by a predetermined distance from one another as considered longitudinally of said fiber, and including a sensing portion which is to be situated at a monitoring location of the body; and
   two periodic gratings of the same periodicity each situated at one of said ends of said sensing fiber length and reflective to a predominant portion of any light that propagates in and longitudinally of said fiber and has a wavelength in a stopband range around a central wavelength corresponding to twice said periodicity while being substantially transparent to light of wavelengths outside said stopband range so that broadband coherent light including sensing light with wavelengths within said stopband range that is launched into a first end of said optical fiber propagates longitudinally of said fiber toward a first of said gratings where said predominant portion of said sensing light is reflected from said first grating and the remainder of said sensing light passes into said sensing fiber length for resonant buildup therein of light at certain wavelengths that are located within said stopband range and depend on the length of said sensing portion as influenced by changes in the monitored parameter, and attendant rendering of said gratings substantially transparent to said sensing light at said plurality of wavelengths following said buildup.

* * * * *